(No Model.) 5 Sheets—Sheet 2.
W. J. WRIGHT.
STAVE TRIMMING, JOINTING, AND PLANING MACHINE.
No. 438,045. Patented Oct. 7, 1890.
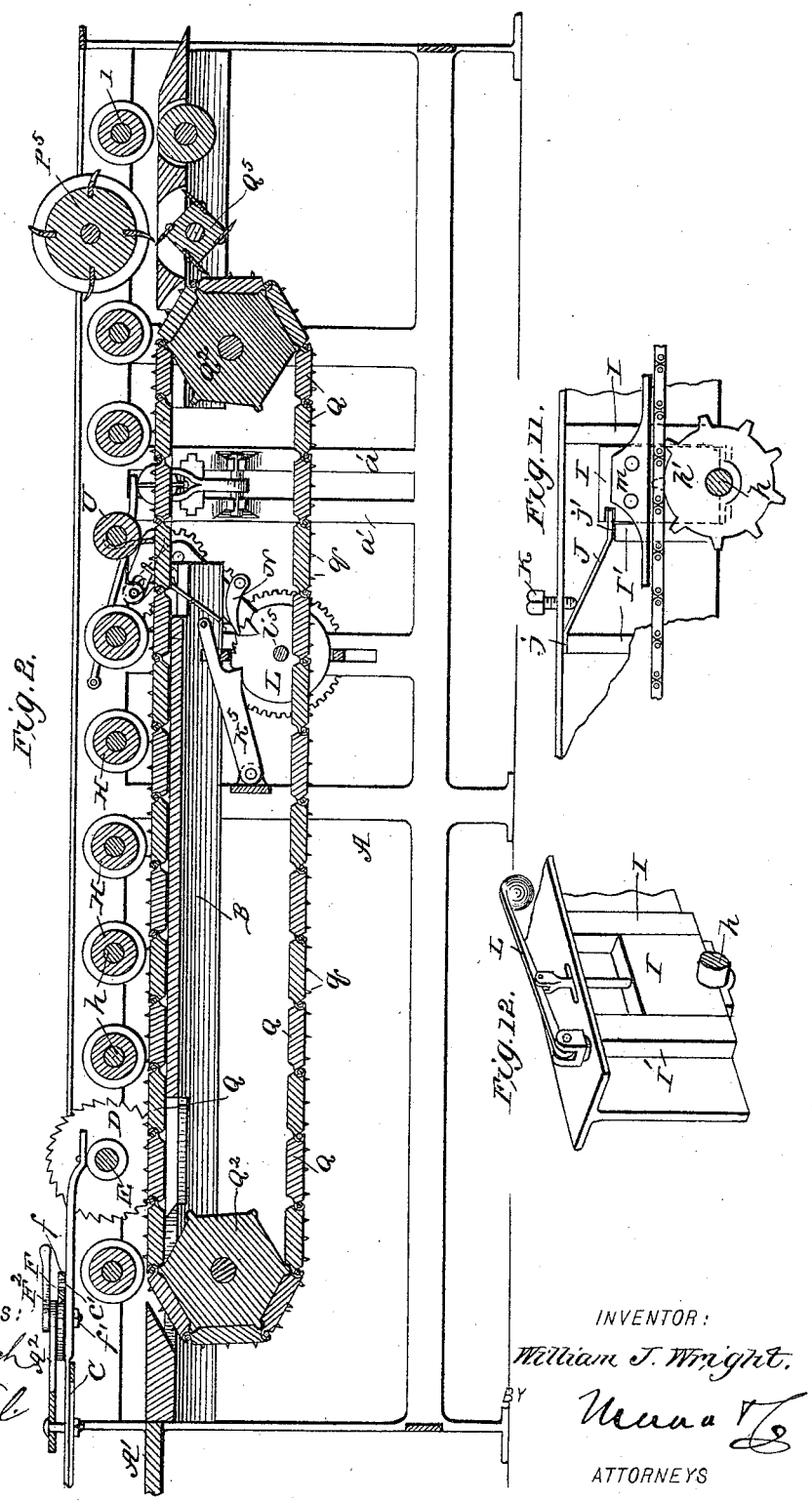
WITNESSES:
Fred G. Dieterich
M. N. Blondel
INVENTOR:
William J. Wright.
BY
ATTORNEYS (No Model.) 5 Sheets—Sheet 3.
W. J. WRIGHT.
STAVE TRIMMING, JOINTING, AND PLANING MACHINE.
No. 438,045. Patented Oct. 7, 1890.
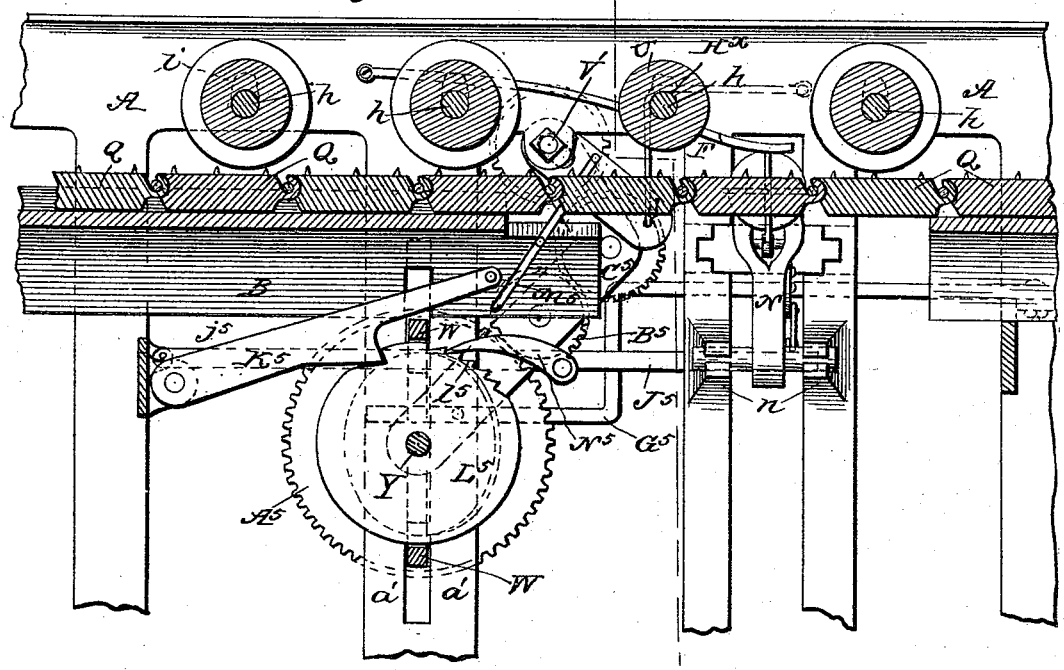
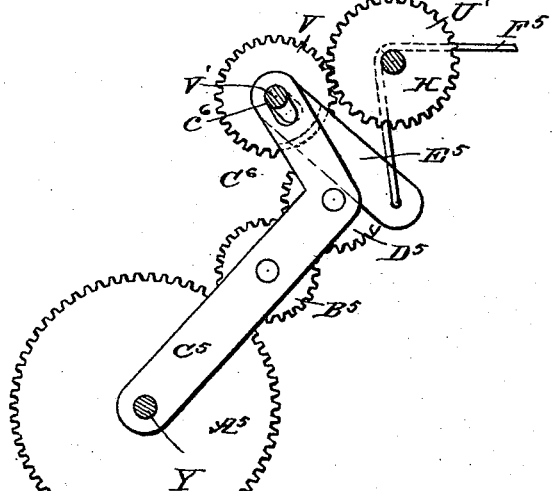
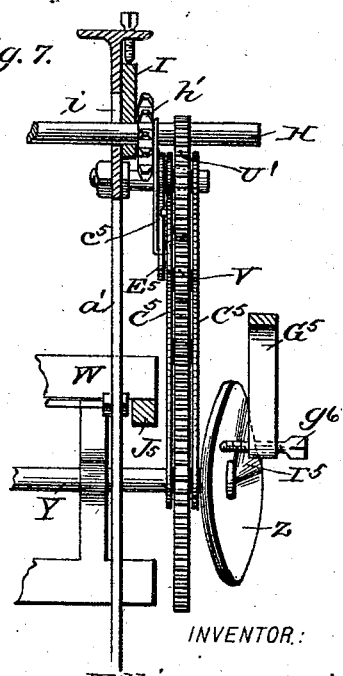
WITNESSES:
Fred G. Dieterich
M. L. Blondel
INVENTOR:
William J. Wright.
BY Munn & Co
ATTORNEYS (No Model.) 5 Sheets—Sheet 4.
W. J. WRIGHT.
STAVE TRIMMING, JOINTING, AND PLANING MACHINE.
No. 438,045. Patented Oct. 7, 1890.
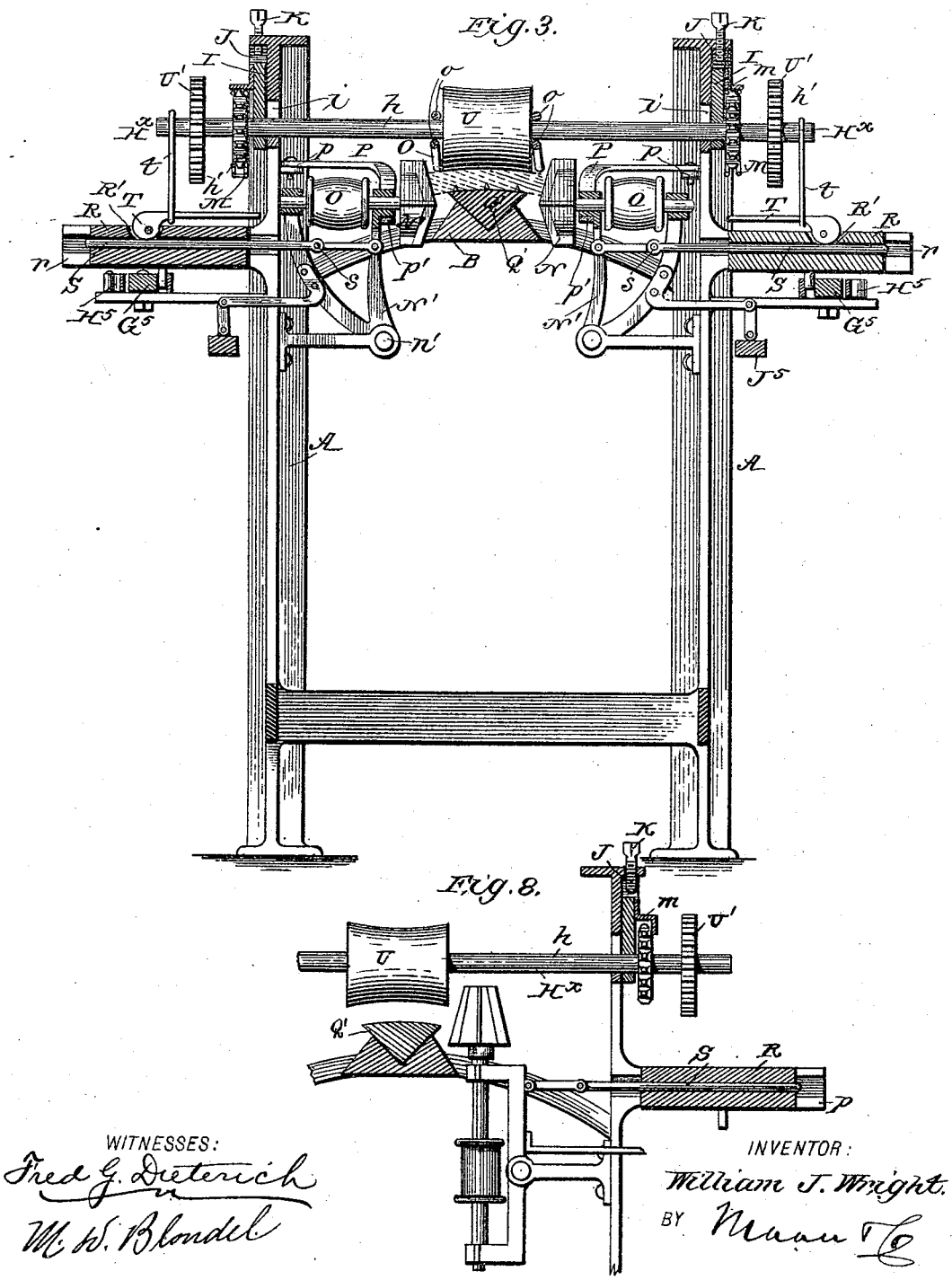
WITNESSES:
Fred G. Dieterich
M. W. Blondel
INVENTOR:
William J. Wright.
BY Munn & Co
ATTORNEYS (No Model.) 5 Sheets—Sheet 5.
W. J. WRIGHT.
STAVE TRIMMING, JOINTING, AND PLANING MACHINE.
No. 438,045. Patented Oct. 7, 1890.
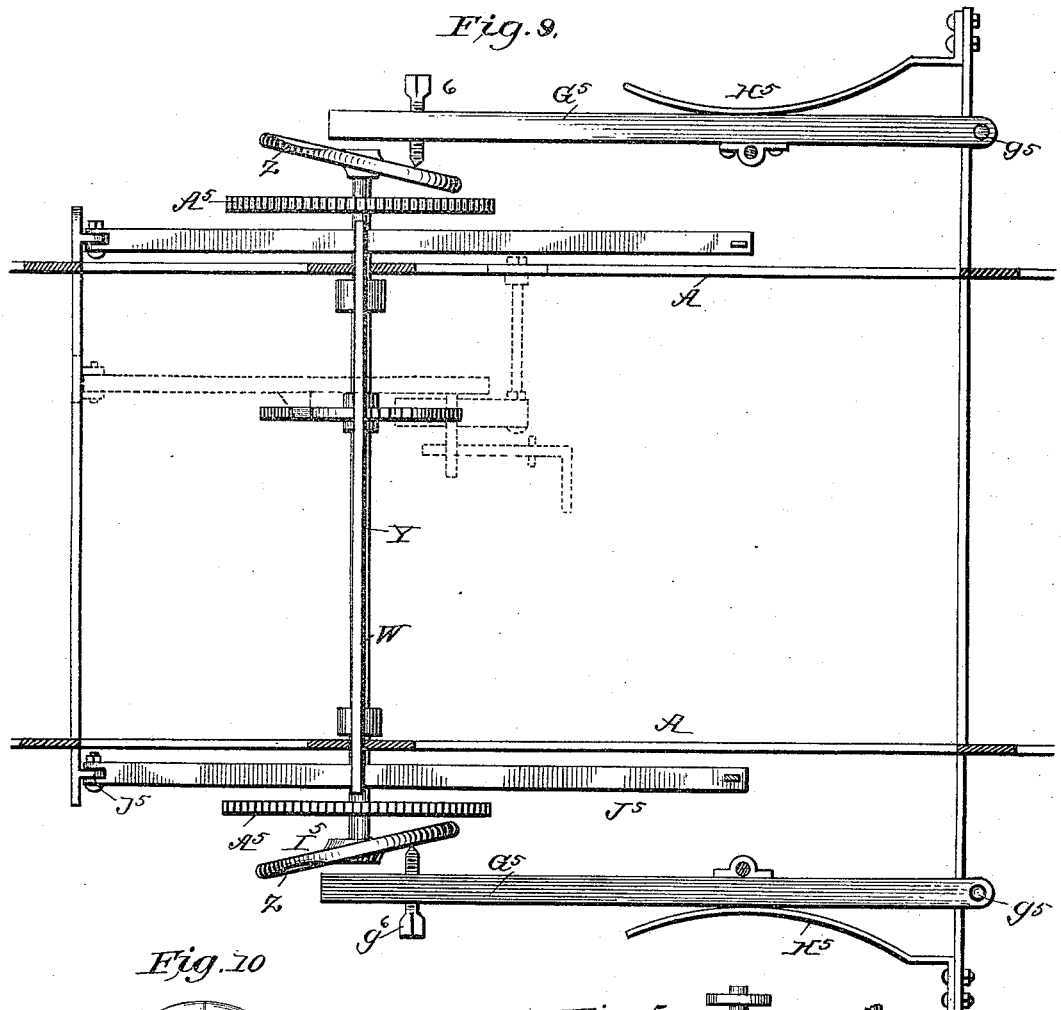
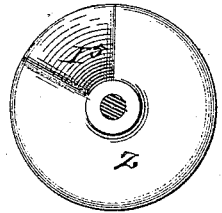
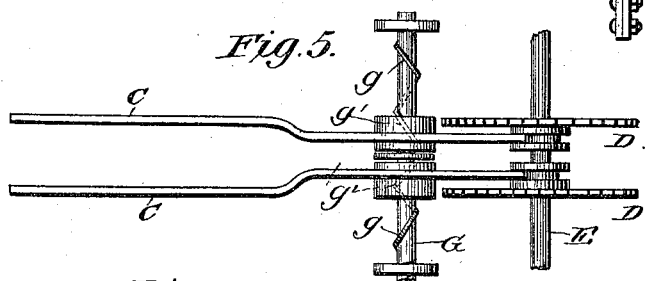
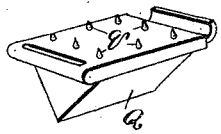
WITNESSES: Fred G. Dieterich, M. W. Blondel.
INVENTOR: William J. Wright.
BY [signature]
ATTORNEYS

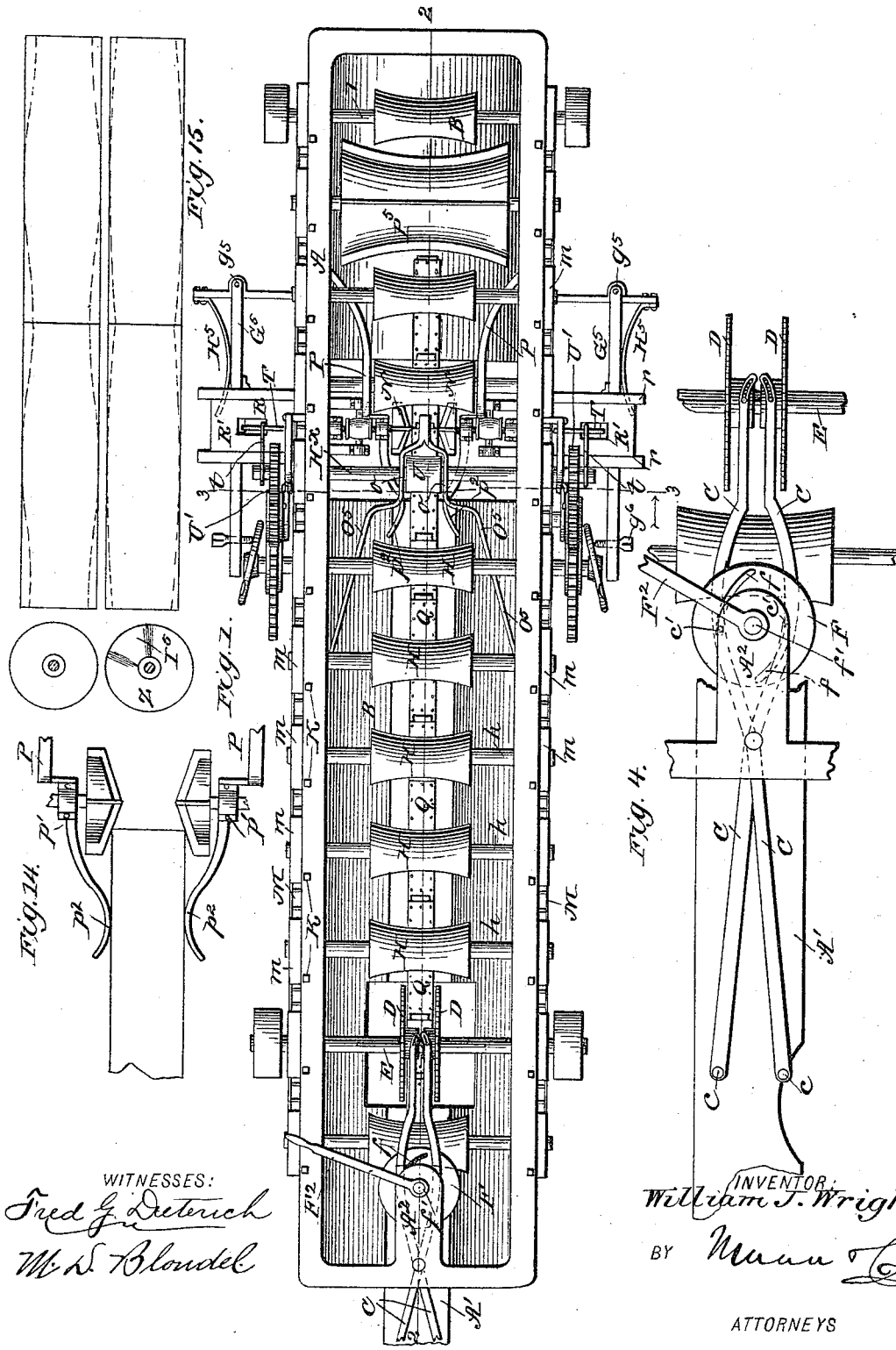

UNITED STATES PATENT OFFICE.

WILLIAM J. WRIGHT, OF COOPERSTOWN, PENNSYLVANIA.

STAVE TRIMMING, JOINTING, AND PLANING MACHINE.

SPECIFICATION forming part of Letters Patent No. 438,045, dated October 7, 1890.

Application filed January 16, 1890. Serial No. 337,090. (No model.)

*To all whom it may concern:*

Be it known that I, WILLIAM J. WRIGHT, residing at Cooperstown, in the county of Venango and State of Pennsylvania, have invented certain new and useful Improvements in Stave Trimming, Jointing, and Planing Machines, of which the following is a specification.

My invention has for its object to provide a stave-making machine wherein the billet is first trimmed to sizes to suit the character of the billet, and after which the billet is automatically fed into the machine through the various stages necessary to complete the stave, and as it progresses automatically controls and sets the cutting devices, so as to cut both the bevel and form the bilge of the stave in exact proportions in relation to the different widths of the billets.

My invention has also for its object to provide suitable means whereby as gage devices are adjusted to trim billets of different widths the trimmer-saws will at the same time be adjusted to the width of the gages when so set.

My present invention relates more particularly to improvements on a similar machine patented by me on March 5, 1889, No. 398,993, and has also for its object to simplify the construction of such machine, and to so change the arrangement of the parts that the operation thereof will be rendered the more practical.

To this end my invention consists of certain sundry arrangements and peculiar combination of parts, all of which will hereinafter be fully described in the annexed specification, and particularly pointed out in the claims, reference being had to the accompanying drawings, in which—

Figure 1 is a top plan view of my improved machine. Fig. 2 is a vertical longitudinal section thereof on the line 2 2, Fig. 1. Fig. 2ª is a similar view of the central portion of the machine. Fig. 3 is a transverse section of the same, taken on line 3 3, Fig. 1. Fig. 4 is a detail plan view of the stave-width gage and the connection between said gage and the trimmer-saws. Fig. 5 is a detail view of a modified arrangement of such devices. Figs. 6 and 7 are detail views of parts hereinafter specifically referred to. Fig. 8 is a detail view of one of the cutters arranged for "slack-work" use. Fig. 9 is a detail plan of the swinging frame, the eccentric-shaft, and the head-block-shifting arms. Fig. 10 is a face view of one of the eccentric disks. Fig. 11 is a detail side view illustrating one of the yielding bearings for one of the upper roller-shafts. Fig. 12 is a similar view of a modification of such bearing. Fig. 13 is a detail view of one of the chain-links. Figs. 14 and 15 are detail views hereinafter referred to.

To render a clear understanding of the construction and arrangement of the several parts of my machine, I shall first proceed to describe the operation thereof in a general way, and then specifically point out and describe the different parts in detail and point out their operative connection with each other.

In the practical construction of my machine I provide a suitably-arranged iron frame formed with a suitable bed, above which are mounted a series of feed-rollers, below which, and centrally over the bed, I arrange a peculiarly-constructed chain-belt or carrier, which carrier and the feed-rollers are propelled by suitable belting from a main drive-shaft to feed the billet forward. In advance of the front end of the said feed-rollers and carrier I form said frame with an extension or billet-support, over which I mount suitable gage devices, the outer ends of which are so adjusted as to normally project downward over the central portion of the billet. The gage-arms are connected at their front ends to the trimmer-saws, and intermediate of their ends I provide a suitable adjusting device adapted to be operated by the operator in such a manner that when he puts a billet in place and he finds that the character of the edges of the same is such as to admit of a stave of a certain width—*e. g.*, three inches wide—he adjusts the gage-arms to be of such width at the billet end, such movement of the staves at the same time adjusting the trimmer-saws to cut a stave of the same width. The billet after leaving the trimmer-saws is engaged by the upper feed-rollers and the endless chain-carrier and carried forward, in its movement engaging suitably-arranged spring-arms disposed in the path of the moving billet, such arms adapted to open or spread apart as the billet passes between them. To these arms are connected the laterally-movable cutting-frames, which carry the revolving cutters, the cutting-faces of which are disposed at the proper angle to cut a bevel of the same angle on billets of different widths—i. e., should a narrow billet be passed between the saws and the cutting-face of the saws adjusted to cut a bevel of a certain angle and a succeeding billet be twice or more the width of the preceding billet the cutters will be automatically adjusted outward, and at the same time cut a bevel of the same angle as before.

Just in advance of the cutters I arrange the upper roller when lifted up by the thickness of the billet, such roller having a yielding bearing to automatically set in operation certain intermediate gear mechanism between it, and means whereby the cutter-frames when moved to their proper position by the billet, as described, will be reciprocated, so as to carry the cutters in such relation to the edges of the billet to form the bilge at the same time they cut the bevel.

As the curvature or arc of a large stave must be from the same center as that of the small stave, I arrange the reciprocating mechanism in such a manner that the degree of the outward movement of the cutters by the billets engaging the spring-arms, before referred to, shall be communicated to certain eccentric disks, so as to adjust them to automatically determine the proper reciprocating movement of the cutters by the width of the billet to hold the lifting-shaft which connects the intermediate gear devices to operate the cutters, as stated, up in position after the billet leaves until said billet passes the cutter. Automatically-operated devices are provided, which also depend for operation on the movement of the billet.

After the billet has passed the cutters and assumed a stave shape it passes to the planing-disks, of which but one is used (the upper) if only ordinary staves are wanted; but when a finer grade of staves is needed, which require planing on both the inner and outer faces, I provide the upper and a lower planer-disk.

After the stave leaves the planers it is discharged at the end of the machine, and is then ready to be set up and steamed into barrel shape in the usual manner.

Having thus in a general way outlined the arrangement and operation of my improved machine, I shall now proceed to specifically point out the construction and operation of each part in detail and to make such description as clear and concise as possible. I shall begin at that point of the machine where the billet first enters and endeavor to describe the parts of the machine in the order of the travel of the billet.

In the accompanying drawings, A A denote the frame of the machine, which is provided with a suitable bed B, the sides of which slope from the center to permit the ready discharge of the chips, splinters, dust, &c., to the sides of the machine.

The front end of the frame is provided with an extension A', which I will term the "billet-bed," as upon it the billet is laid before it is started on its passage into the machine.

$A^2$ denotes a rearward extension, upon the under face of which are centrally pivoted two lever or gage arms C C, the forward ends of which extend to about midway of the extension A', and are provided at their ends with downwardly-projecting fingers or pointers c c, as shown. The forward end of said gage-arms are connected with hubs of the trimmer-saws D, said saws being mounted to slide on a transverse shaft E, journaled on the main frame, preferably between the first and second feed-rollers. Between the pivotal point of said gage-arms and the saws I pivot upon the extension $A^2$ a disk F, provided with eccentric slots $f\,f$, arranged opposite each other, and which engage upwardly-projecting pins $c'\,c'$ on the gage-arms. The pivot $f'$ of the disk F extends above the plate $A^2$, and is provided with a suitable operating-handle $F^2$, as clearly shown in Figs. 1 and 4 of the drawings.

By this construction it will be observed that when the operator places a billet on the extension A' he adjusts the disk F to spread the outer ends of the gage-arms to the width which the character of the particular billet will admit of, at the same time adjusting the trimmer-saws outwardly or inwardly on the shaft E, ready for trimming the billets as they pass into position.

Instead of employing the disk F for adjusting the gage-arm, I may employ the device shown in Fig. 5, which consists of an additional short shaft G, mounted parallel to the saw-shaft, provided with a right and left hand worm-thread $g$, which engages worm-grooves $g'$ in the gage-arms C, which in this arrangement are disposed parallel, the rear ends thereof engaging the saw-hubs, as shown. Any suitable means may be employed to revolve the shaft G, the movement of which will adjust the gage-arms to the position desired.

H denotes a series of feed-rollers, journaled in yielding bearings in the sides of the frame above the bed of the machine. The shafts $h$ $h$ of these rollers pass through elongated journal-bearings $i\,i$ in the frame and engage spring bearing-boxes I I, having vertical motion in guides I' I', formed on the outer faces of the frame, as most clearly shown in Fig. 11, by reference to which it will be seen that one of each pair of guides I' is stopped short to permit vertical play of a flat spring J, held at its end $j$ to the frame, while its end $j'$ engages the upper end of the bearing, a limit-screw K being employed for each spring J for regulating the tension.

From the aforesaid construction it will be seen that as the several upper rollers are raised by the passing billet the spring will force the bearing-boxes I back when said billets pass by the rollers.

Instead of using the spring J, I sometimes employ a weighted arm L to bring the bearings I back to their lower position, and arrange such arm in a manner shown in Fig. 12 of the drawings.

The outer ends of the roller-shafts $h$ are each provided with sprocket-wheels $h'\,h'$, over which pass endless chains M, driven from a main power-shaft in a manner hereinafter described; and to keep said chains always in proper contact with the several sprocket-wheels I arrange guides $m\,m$, secured to the faces of the yielding bearings I, (see Fig. 11,) which overlap the chain and hold the same from becoming disconnected from the sprockets $h'$.

One of the shafts H, which I will term the "lifting-shaft," has a roller of less length than the others, and is disposed just in advance of the cutting devices, which are most clearly shown in Figs. $2^a$ and 3 of the drawings, by reference to which it will be seen that I arrange the cutters N N in a vertical plane, connected to the outer end of shafts horizontally journaled in a swinging frame N', pivoted at $n'$, to the frame of the machine, said shafts being provided with drive-pulleys O O, said frame being disposed at opposite sides of the bed of the machine, as shown.

P P denote spring-arms, secured at one end $p$ to the frame, and each connected to the cutter-shafts at $p'$, and their ends passed forward and conveyed, as at $p^2\,p^2$, said ends disposed over the bed of the machine in the path of the movement of the billet, the relation of the distance between the adjacent faces of the cutters and the faces of the arms being such that the cutters are close enough to bevel the edges of the billet on the desired bilge.

As before stated, an endless carrier-belt passes over the bed, such belt engaging the lower face of the billet. I prefer to construct such belt of a series of links Q Q, one of which is shown in detail in Fig. 13, each of which have short prongs $q\,q$, which bite into the billet and with the upper rollers carry it forward, said carrier-belt being mounted upon sprocket-wheels $Q^2\,Q^2$, mounted in the frame and driven in a manner hereinafter set forth. Now, assuming the billet to be moving forward, its forward end will engage the spring-arms P P and spread them, which in their movement will force the cutters outward to their first or set position ready to begin the cutting. (See diagram, Fig. 14.)

R R denote the head-blocks, which are mounted to reciprocate in bearings $r\,r$, extended laterally from the frame, said blocks having each a longitudinal aperture R' R', in which operate sliding bolts S, each having a jointed connection $s$ at its outer end to its respective cutter-frame.

Following the above connections, it will be seen that when the cutter-frames are moved outward by the arms P the bolts S are forced back into the head-blocks. Now, as it is essential that after the cutters are thus set that they should maintain their proper relation during their subsequent movement, it is necessary that they be locked in such relation before they begin to cut. To this end I provide each of the head-blocks with a cam-lock T, which is adapted to engage the bolt S, and I connect said cams with the lifting-shaft $H^\times$ by means of links or rods $t$. (See Fig. 3.) By this connection it will be seen that when the billet engages the lifting-roller shaft $H^\times$ it raises it and causes it to operate the cams and bind them against the bolts, and hold said head-blocks and bolts locked during the entire time the shaft $H^\times$ remains raised.

As in my other patent, I employ the lifting-shaft $H^\times$ as the means for setting in motion the mechanism for operating the bilging devices. In this case, however, I employ simpler and more effective means. I provide each end of the lifting-shaft with a cog-gear U', which meshes with an idler-gear V, journaled to the side bars of the frame, as shown.

W denotes a vertically-movable frame, held to slide in guides formed by the side bars $a'\,a'$ of the frame, which carries a transverse shaft Y, projected to each side of the frame, and provided on said ends with the disks or eccentrics Z Z, and with the large gear-wheels $A^5$, which normally mesh with an idler-gear $B^5$, mounted in arms $C^5$, held at their lower ends upon the shaft Y, while their upper ends $C^6$ are bent upward and have a movable bearing on the journal of the idler-gear V. The gears $B^5$ engage cog-gears $D^5$, which normally are disposed close up to but not in contact with the idler V.

The upper ends $C^6$ of the arms $C^5$ are provided with curved projections $c^6$, which engage curved grooves in the inner faces of links $E^5$, which have a movable connection at one end to the idler-gear shaft V', their lower ends being supported on spring-arms $F^5$, passed up over the shaft of the lifting-roller $H^\times$, and then secured to the frame, as most clearly shown in Figs. 6 and 7.

By this construction it will be observed that as the lifting-shaft $H^\times$ is raised it engages the arms F and causes them to push the upper end $C^6$ of the arms $C^5$ upward and causes the gear $D^5$ to engage the idler V and to remain in engagement therewith as long as the said shaft $H^\times$ remains elevated.

$G^5$ denotes the horizontally-disposed swinging arms, which are pivoted at one end $g^5$ to the frame, their forward ends being disposed adjacent the eccentric disks, being provided with contact-screws $g^6$, which engage the said disks, being normally held in contact therewith by means of the leaf-spring $H^5$, said swinging arms $G^5\,G^5$ being connected to the head-blocks, as shown.

The operation of the eccentric disks on the swinging arms is precisely similar to that shown in my patent referred to with this exception: I provide each of the eccentrics with a radial depression $I^5$ larger at the periphery than at the center. The object of forming the depression is to produce an abrupt movement at each end of the billet to get what is technically termed the "end bilge" on the stave, as I find from experience when eccentrics of a continuous smooth face are employed a continuous compound curve is formed, (see Fig. 14,) which necessitates waste of material and prevents careful fitting of the staves; but by using an eccentric with the depression arranged to come in contact with the arms $G^5$ at the beginning and end of the billet I am enabled to cut them in a shape shown in Fig. 15. As before stated, the curves of the bilge of all the staves must be concentric irrespective of their widths, I provide the vertically-swinging arms $J^5 J^5$, pivoted at one end to the frame at $j^5$, passed under the frame W, which supports the eccentric-disk shaft and connect their free ends to the swinging cutter-frames, whereby the said arms $J^5 J^5$ will be raised and lowered and carry with them the frame W, according to the movement of the cutter-frame, which movement is regulated by the width of the passing stave.

As the parts are of such construction that the shaft should only make one complete revolution to each billet, and to prevent it getting slightly too much movement, I provide a pivoted dog $K^5$, which engages a stop-notch in the disk $L^5$, secured upon said shaft, which is lifted out of said notch by means of a tilting-bar $M^5$, pivoted to the bed of the machine in advance of the lifting-roller, its upper end arranged to be engaged by the passing billet before said billet reaches the roller $H^x$, and whereby its lower end will engage the dog $K^5$ and disengage it from the disk $L^5$, a holdback-pawl $N^5$ being provided, which engages a series of teeth $l^5$ in said disk, which prevents reverse movement of said disk. If desired, suitable means (not shown) may be employed to turn said disk by hand to set it in proper position when billets which are unusually short are operated on.

When the machine is to be used for what is termed "slack work"—*i. e.*, where staves are made for common barrels in which the exact fit is not essential—I employ a vertically-disposed cutter, arranged as shown in Fig. 8, which may be driven at a greater speed, as its exact movement is not essential.

To hold the lifter-shaft $H^x$ up after the billet has passed until it passes the cutters, I provide two rods $O^5 O^5$, the outer ends of which are connected to the frame, while their inner ends $o\ o$ are looped over the shaft $H^x$ and projected in line with the cutter. In operation the ends $o\ o$ lie on the upper face of and engage the billet until it (the billet) passes the cutters, thereby holding said shaft $H^x$ until after the cutting is over. The shaft $H^x$ then drops back into place, which movement sets the several adjacent parts into position to be free for adjustment by the next succeeding billet.

$P^5$ denotes the upper planer, and $Q^5$ the lower planer, which are disposed just at the end of the chain belt. The upper planer is always in operation and serves to plane the convex surface of the staves. The lower planer-knives are made removable, and are only used when staves are made which must have both sides smooth, such staves as are usually employed for making pork, molasses, and pickle barrels, and the like.

Any suitable means may be employed for operating the various drive-pulleys, preferably by providing a central drive-shaft (not shown) having stepped pulleys, such shaft adapted to receive motion from a main drive-shaft. It is obvious, however, that the arrangement of such means is immaterial, as these may be varied to suit the surrounding conditions of the machine.

From the foregoing description, taken in connection with the drawings, the advantages and operation of my machine will be readily understood. By it I produce the means whereby a rough billet when put into the machine will pass through the several stages, whereby it is turned into a stave having the proper bevel and bilge, the billet itself serving as the means for automatically setting and moving the several parts to do their work.

Having thus described my invention, what I claim, and desire to secure by Letters Patent, is—

1. The combination, with the main frame and the bed of the machine, means for feeding the billet forward, a shaft transversely journaled over said bed, and saws held to rotate with said shaft and adapted for endwise movement thereon, of gage-arms centrally pivoted over the feed end of said bed, their outer ends disposed to indicate the degree of the desired width of the billet and their other ends connected with the trimmer-saws, and means intermediate the pivot of the said gage-arms and the saws, whereby said arms may be spread open or drawn in, substantially as and for the purpose described.

2. The combination, with the main frame, the bed, means for feeding the billet forward, a shaft journaled transversely over said bed, and saws held to rotate on said shaft and have endwise movement thereon toward or from each other, of gage-arms centrally pivoted over the bed in advance of the saws, their front ends projected over the billet-bed and adapted when set to indicate the width of the stave to be cut, and their opposite ends connected to the saws, and means for adjusting said gage-arms arranged intermediate of the said ends of said gage-arms, whereby said arms may be adjusted to indicate the width of the stave to be cut and adjust the saws the same width at the same time, all arranged substantially as and for the purpose described.

3. The combination, with the trimmer-saws journaled over the bed of the machine, of an endless carrier operating beneath the said saws, adapted to carry the billet forward, cutting devices pivotally supported on the frame at opposite sides of the carrier, spring-arms connected at one end to the frame and to the cutters, the front ends thereof projected forward over the bed in advance of the cutters and in the path of the moving billet, said ends adapted to be forced apart by the moving billet pressing against said ends, whereby said arms will serve to spread the cutting devices and set them to their proper width, and means for operating the saws and carrier, substantially as shown and described.

4. The combination, with the bed of the machine, the billet-feeding devices, and the lifting-roller $H^\times$, mounted in yielding bearings over the bed in advance of the cutters, of transversely-movable cutting devices mounted to each side of the bed, as shown, devices intermediate the cutters and the moving billet, whereby the cutters are set automatically in relation to the width of the staves, the reciprocating head-blocks R, the sliding bolts connected to the cutter-frames and operating in said head-blocks, the cam for locking said bolts in adjusted position, a connection between said cam and the lifting-shaft $H^\times$, whereby the movement of the billet will automatically lock said bolt in adjusted position as the shaft $H^\times$ is raised, and means for reciprocating the head-blocks, substantially as and for the purpose described.

5. The combination, with the machine-bed, the billet-feeding devices, the laterally-reciprocating cutters, the lifting-shaft disposed in advance of the cutters, and devices intermediate the cutter-frame and the advancing billet, whereby said billet will engage said devices and automatically set the cutter-frames, of the reciprocating head-blocks R, the connections S between said blocks and the cutter-frames, the cam-locks T, the connections $t$ between said cams and the lifting-shaft, whereby the rise of said shaft will lock the cutter-frame in adjusted position, a vertically-adjustable frame W, held to the main frame, carrying a transverse shaft Y, provided with eccentric disks Z, swinging arms $J^5$, pivoted at one end to the main frame, adapted to engage said vertically-movable frame W, and connected at their free ends to the cutter-frames and adjusted vertically by the lateral movement of said cutter-frame, intermediate gearing between the eccentric shaft and the lifting-shaft and adapted to be set in operation when said shaft is raised, horizontally-swinging arms $G^5$, connected with the head-blocks and operated by the eccentric disks, all arranged substantially as and for the purpose described.

6. The combination, with the pivoted cutter-frames carrying the cutters and the lifting-shaft arranged in advance of the cutters, of reciprocating head-blocks R, the sliding bolts S, connected to the cutter-frames and operating in the head-block, the cam-locks T, the connections $t$ between said lock and the lifting-shaft, the horizontally-swinging arms $G^5$, and the intermediate devices between said head-blocks and the lifting-shaft, said devices and the lifting-shaft normally out of operative contact and adapted to engage for operation when said lifting-shaft is raised, substantially as and for the purpose described.

7. The combination, with the frame and the lifting-shaft, of the temporary support $O^5$, pivoted at one end to the frame, its forward ends engaging the lifting-shaft, said ends extended toward the cutters, said ends adapted to rest upon the rear end of the billet after it passes the lifting-shaft and hold said shaft in its uppermost position, substantially as and for the purpose described.

8. The combination, with the swinging cutter-frames N', the head-blocks R, and the slide-bolt connections S between said blocks and cutter-frames, of the vertically-reciprocating frame W, carrying a transverse shaft, the eccentric disks secured thereto, the vertically-swinging arms $J^5$, engaging said frame, the connection between the cutter-frames and the free ends of said arms, the horizontal swinging arms $G^5$, operated by the eccentrics and connected to the head-blocks, means for normally holding the ends of said arms in contact with the disks, and means for operating the eccentric-disk shaft and the cutter-frames, substantially as and for the purpose described.

9. In a combined stave trimmer, jointer, and planer machine, essentially as described, the combination, with the eccentric shaft Y, gears $A^5$, mounted on the outer ends, the idler-gears V, mounted on the frame, and the arms $C^5$, pivoted at their lower ends on the shaft Y, and having a movable bearing at their upper ends to the idler-gear shaft V', said arms carrying the intermediate cog-gears $B^5$ $D^5$, normally out of connection with the idler-gear V, of the lifting-shaft $H^\times$, carrying gears U, engaging the idlers V, a connection between said shaft and the arms $C^6$, whereby when the lifting-shaft is raised the gears $D^5$ will engage the idler V, and means for operating the cutters, substantially as and for the purpose described.

10. The combination, with the lifting-shaft $H^\times$, provided with gears U, idler-gears V, mounted on the frame normally in contact with the gears, the eccentric shaft Y, held to slide vertically on the main frame, the gears $A^5$, mounted on the ends thereof, and arms $C^5$ $C^6$, journaled at their lower ends on the eccentric shaft Y and their upper ends $C^6$ provided with elongated bearings held on the gear-shaft V', said arms provided with radial projections and carrying the intermediate gears, of the links $E^5$, having an elongated bearing on the shaft V', provided with recesses engaging the projections, the spring-arms $F^5$, secured at one end to the frame, passed over and resting on the lifting-shaft, and having depending ends engaging the lower ends of the links, all arranged whereby when the shaft H is raised the several gears will mesh and impart motion to the eccentric shaft, substantially as and for the purpose described.

11. The combination, with the eccentric shaft and the disk $L^5$, mounted thereon, provided with a peripheral notch in one side and a series of teeth $l^5$ in its opposite side, of a pivoted dog $K^5$, normally engaging said notch, a holdback-pawl $N^5$, engaging the teeth, and a tripping-arm $M^5$, pivoted to the bed of the machine, its upper end projected in the path of the moving billet and the lower end adapted to lift the pawl from the notch when the upper end is engaged by the moving billet, substantially as and for the purpose described.

12. The combination, with yielding roller-shafts journaled in elongated bearings in the main frame and their outer ends provided with sprocket-wheels, of the yielding bearings I, provided with projecting flanges lapping over the sprocket-wheels, substantially as and for the purpose described.

WM. J. WRIGHT.

Witnesses:
R. E. DAMGOLIE.
F. C. POWER.